(12) United States Patent
Venkatesh et al.

(10) Patent No.: US 7,976,387 B2
(45) Date of Patent: Jul. 12, 2011

(54) FREE-STANDING INPUT DEVICE

(75) Inventors: Shalini Venkatesh, Santa Clara, CA (US); Akihiro Machida, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 939 days.

(21) Appl. No.: 11/402,380

(22) Filed: Apr. 11, 2006

(65) Prior Publication Data

US 2007/0236452 A1 Oct. 11, 2007

(51) Int. Cl.
| | |
|---|---|
| *A63F 9/24* | (2006.01) |
| *A63F 13/00* | (2006.01) |
| *G06F 17/00* | (2006.01) |
| *G06F 19/00* | (2011.01) |
| *G06F 3/033* | (2006.01) |
| *G02B 5/12* | (2006.01) |
| *G09G 5/00* | (2006.01) |
| *G09G 5/08* | (2006.01) |

(52) U.S. Cl. .......... 463/37; 463/1; 463/36; 463/38; 359/516; 359/517; 345/156; 345/166

(58) Field of Classification Search .......... 463/37, 463/1, 36, 38; 359/516, 517; 345/156, 166
See application file for complete search history.

(56) References Cited

U.S. PATENT DOCUMENTS

| | | | | |
|---|---|---|---|---|
| 5,401,025 | A * | 3/1995 | Smith et al. | 463/5 |
| 5,608,528 | A * | 3/1997 | Ogawa | 356/620 |
| 5,786,804 | A | 7/1998 | Gordon | |
| 6,146,278 | A * | 11/2000 | Kobayashi | 463/53 |
| 6,183,365 | B1 * | 2/2001 | Tonomura et al. | 463/36 |
| 6,433,780 | B1 | 8/2002 | Gordon et al. | |
| 6,544,124 | B2 * | 4/2003 | Ireland et al. | 463/37 |
| 6,720,949 | B1 * | 4/2004 | Pryor et al. | 345/158 |
| 6,890,262 | B2 * | 5/2005 | Oishi et al. | 463/31 |
| 6,950,094 | B2 | 9/2005 | Gordon et al. | |
| 7,137,711 | B1 * | 11/2006 | Reiffel | 359/516 |
| 7,391,008 | B2 * | 6/2008 | Fouquet et al. | 250/226 |
| 7,428,318 | B1 * | 9/2008 | Madsen et al. | 382/107 |
| 2002/0010021 | A1 * | 1/2002 | McCauley | 463/37 |
| 2003/0153387 | A1 * | 8/2003 | Small et al. | 463/49 |
| 2003/0171190 | A1 * | 9/2003 | Rice | 482/57 |
| 2004/0102247 | A1 * | 5/2004 | Smoot et al. | 463/36 |
| 2005/0009605 | A1 * | 1/2005 | Rosenberg et al. | 463/36 |
| 2005/0175362 | A1 * | 8/2005 | Wilson | 398/212 |
| 2006/0237633 | A1 * | 10/2006 | Fouquet et al. | 250/221 |
| 2006/0238492 | A1 * | 10/2006 | Fouquet et al. | 345/156 |
| 2007/0060228 | A1 * | 3/2007 | Akasaka et al. | 463/1 |
| 2007/0126700 | A1 * | 6/2007 | Wright | 345/161 |

* cited by examiner

*Primary Examiner* — Peter DungBa Vo
*Assistant Examiner* — Wei Li

(57) ABSTRACT

A controller apparatus for manipulating objects in an electronic application. The controller apparatus comprises a free-standing graspable controller. The controller apparatus comprises a first optical component and a second optical component to determine the rotation direction and speed of the controller. The direction and speed data are relayed to the electronic device to produce an object manipulation in the electronic application.

11 Claims, 3 Drawing Sheets

FREE-STANDING INPUT DEVICE

TECHNICAL FIELD

The present application relates generally to a free-standing hand held controller for manipulating objects in an electronic application. More particularly, the present application relates to a free-standing graspable steering device in communication with an optical measurement system.

BACKGROUND OF THE INVENTION

Computer games, simulations, and other electronic applications use steering controller units to simulate "real world" steering devices such as car, truck, motorcycle, and airplane steering devices. The steering controller units generally include a base that may house various buttons and controls, a steering device that may house various buttons and controls, and a column connecting the steering device to the base. The base is connected to a game console that is in turn connected to a device that displays the game, simulation, or other application. Users hold the steering device much in the same manner as a "real world" steering device, that is by grasping it in predetermined places, usually at the perimeter of the controller. Users manipulate the steering device by turning/rotating the device and by operating the various controller buttons, pads, and dials. The device manipulation produces changes to the electronic application; for example, turning the steering device left causes a car in a computer game to turn left to a corresponding degree.

The various steering controller units mentioned above have unfortunate drawbacks. The steering controller unit is bulky because the steering device is connected to a column and base. The bulkiness makes the controller unit difficult to use in small spaces, store, and move. The controller unit is prone to wear, tear, and breaking because of the number of moving parts and the fragility of the steering column. The controller unit also has the drawback of confining and constricting the user to a small area, namely, where the controller unit is placed.

BRIEF SUMMARY OF THE INVENTION

Embodiments of the present invention are directed to a controller apparatus for manipulating objects in an electronic application in association with an electronic device. The controller apparatus comprises a free-standing hand held controller, first optical component and a second optical component. At least the first optical component is in communication with the electronic device and the second optical component is attached to the controller. The controller provides a manipulation function for objects in an electronic application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
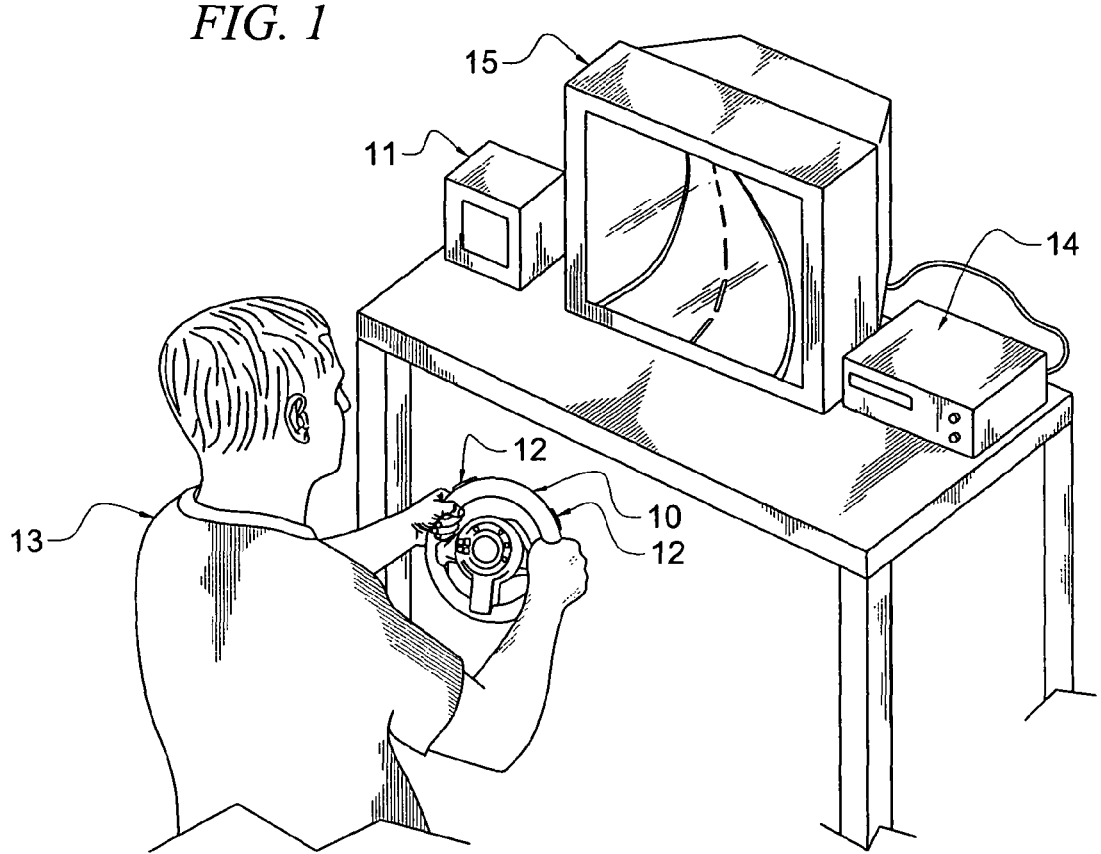
FIG. 1 is a perspective view of an embodiment of the present invention in use.

Referring to FIG. 1, in one embodiment, the present invention comprises steering device 10. While the discussion below generally refers to a steering device, those skilled in the art will understand its applicability to other input devices or controllers. Steering device 10 is held by user 13 and is freestanding, meaning that it does not depend on other mechanical equipment (other than user 13) for support.

Figure 3A:
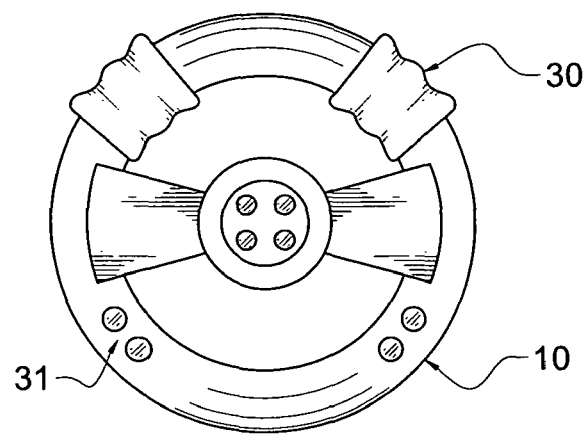
FIGS. 3A, 3B, and 3C are perspective views of different embodiments of a portion of the present invention.
Figure 3B:
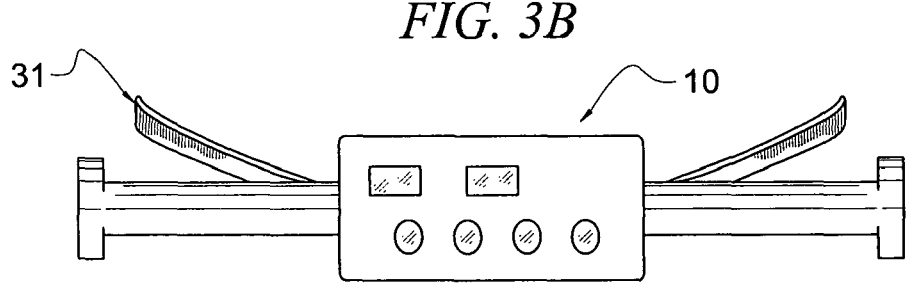
Figure 3C:
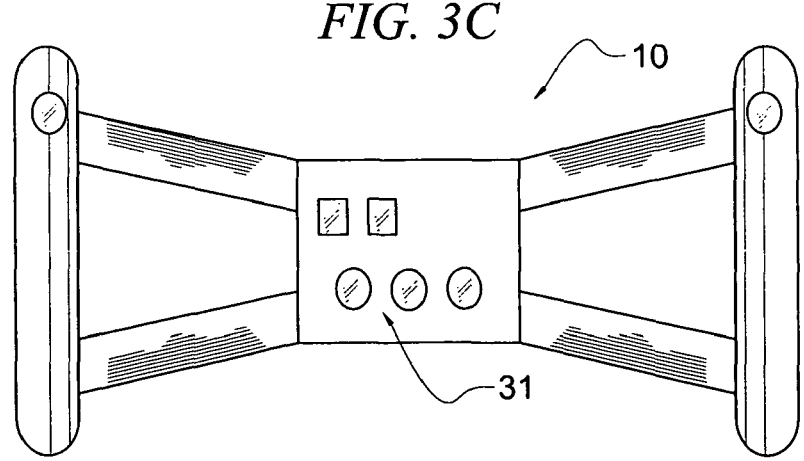

Referring to FIGS. 3A, 3B, and 3C, steering device 10 is preferably round like a steering wheel as shown in FIG. 3A, but may take on various shapes and configurations, such, but not limited to, a solid disk, a racing steering wheel, a ship steering wheel, a motorcycle (or snow mobile or bicycle) steering device as shown in FIG. 3B, and an airplane steering device as shown in FIG. 3C. Steering device 10 preferably has at least two grips 30 at its circumferential edge for the user's hands to grip, although other configurations are possible such as, but not limited to, hand grips at non-circumferential edges and grips modified for use with arms, feet, etc. Grips 30 may comprise finger-sized indentations or ridges. Grips 30 may further comprise material that is user-comfortable and non-slipping to provide improved graspability and comfort. In some embodiments, steering device 10 is lightweight to limit fatigue in the user.

Referring back to FIG. 1, steering device 10 is in communication with electronic device 14. As used herein, electronic device 14 may comprise a personal computer, a game console, a handheld device, an interactive television, or the like. Electronic device 14 is in communication with a display device 15 that displays output from an electronic application performed by the electronic device. The electronic application may be any number of applications, including, but not limited to, a video game, a simulation, a personal computer executable program, or an application on an interactive television. Steering device 10 provides a manipulation function for objects in an electronic application. Although other embodiments are possible, preferably the manipulation function corresponds to a turning feature, such as, but not limited to turning an automobile, airplane, or ship in an electronic application. In this embodiment, the rotation degree of the steering device corresponds to the degree of turning in the electronic application. Similarly, the rotation and/or rotation speed of the steering device corresponds to the turn or speed of the turn in the electronic application in some manner, e.g., 1 to 1, 1 to 2, 2 to 1, etc. The manipulation function may also be, for example, zooming in or out of a display, scrolling through data in an electronic application, or turning or moving an object or character in a video game or simulation.

Objects in an electronic application may be any object within any electronic application. Although objects within software code, such as routines, subroutines, and object code provide examples of objects in an electronic application, other objects are within the scope of the invention. For instance, objects may also include the zoom status of a display, the channel setting on an interactive television, or the scroll location within data.

Steering device 10 may further comprise additional buttons, pads, levers, and the like, generally represented as 31 in FIGS. 3A, 3B, and 3C, for additional manipulation functions for objects in an electronic application. While one skilled in the art will appreciate that many different functions are available for the additional buttons and the like, some non-limiting examples include a start button, a pause button, a volume control, a firing button, a zoom button, a menu button, a gear shift, a brake button or lever, and a clutch button or pedal.

Referring to FIG. 1, steering device 10 is in communication with at least one first optical component 11 via at least one second optical component 12. First optical component 11 and second optical component 12 use optical technology to measure various parameters to include, but not limited to, the movement speed and rotational direction of steering device 10. Second optical component 12 is attached to steering device 10. As used herein, attached to has a broad meaning, including removably or permanently attached by any manner known in the art, including, but not limited to, fasteners, glue, Velcro-type material, being embedded in steering device 10, ties, clamps, etc.

Second optical components 12 may be placed anywhere on the steering device 10 as long as a line of sight is provided to first optical component 11. In one embodiment, second optical components 12 are provided on the back of steering device 10, that is, the side of steering device facing directly away from user 13. Although not shown, first optical component 11 typically houses conventional electronic circuits and the like for transmitting data from or relating to steering device 10 to electronic device 14. First optical component 11 may be incorporated into the electronic device 14 or it may be a stand alone unit. In the case of a stand alone unit, first optical component 11 is in communication with electronic device 14 such that data is transmitted from first optical component 11 to electronic device 14 in any known manner, including, but not limited to, a cord, a wireless radio frequency frequency, an optical signal, or an infrared signal. In some embodiments, first optical component 11 is a part of electronic device 14, such as by being built into or fixably attached to electronic device 14.

Figure 2:
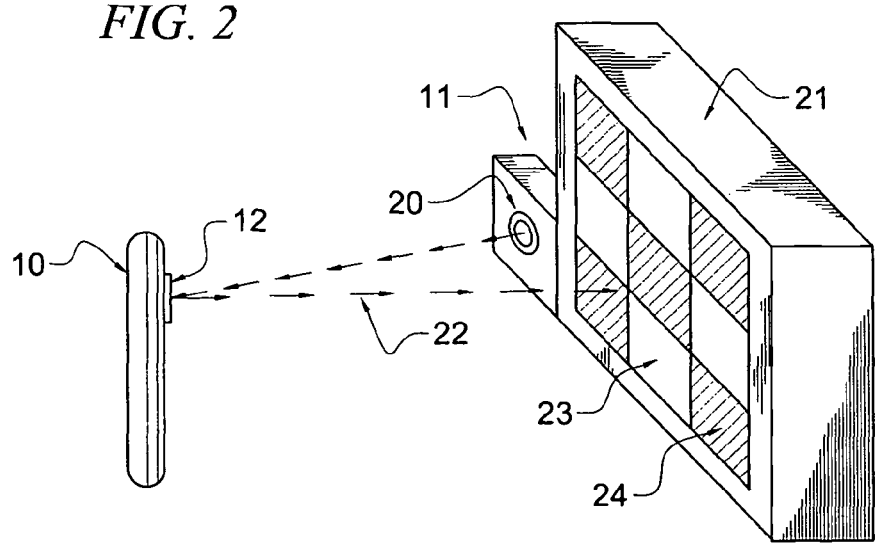
FIG. 2 is a perspective view of a portion of an embodiment of the present invention.
Figure 5:
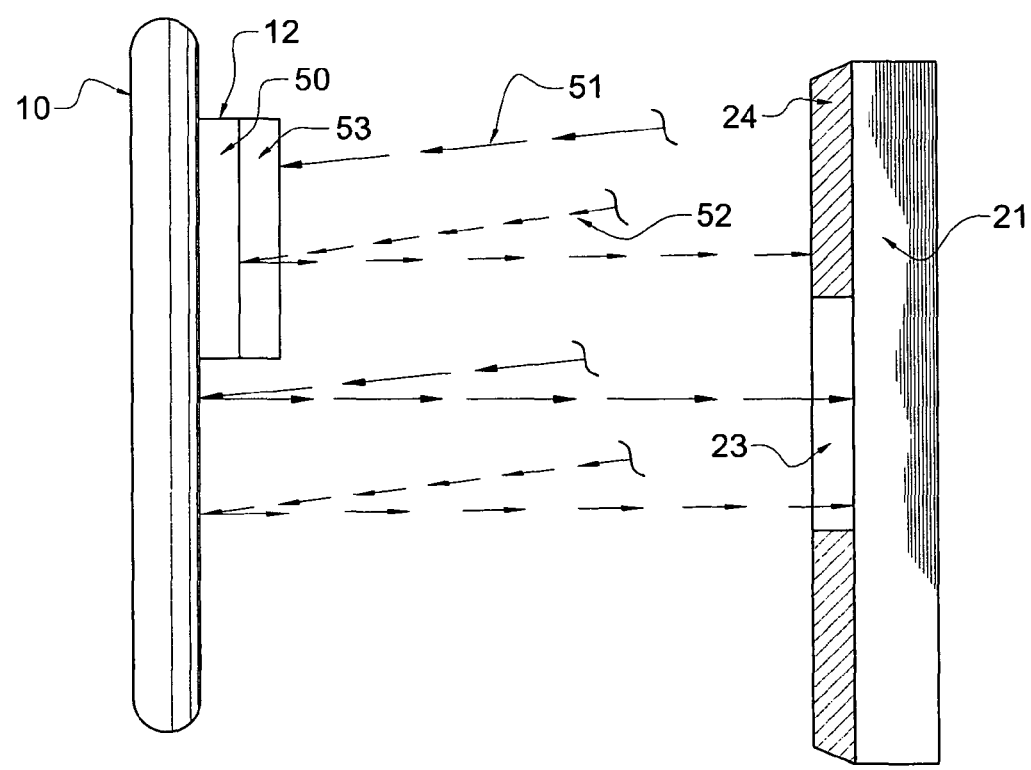
FIG. 5 is a side view of a portion of an embodiment of the present invention.

In one embodiment, referring to FIG. 2, steering device 10, first optical component 11, and second optical component 12 use a reflective method to measure the rotation amount, the rotational direction and/or speed of steering device 10. In the reflective method, the first optical component 11 comprises an illuminating source 20 and a light sensor 21. The illuminating source 20, typically a light emitting diode (LED), is preferably juxtaposed near light sensor 21 and emits light 22 in the direction of steering device 10. Referring to FIGS. 2 and 5, illuminating source 20 emits light 22 at two wavelengths, a higher wavelength 51 and a lower wavelength light 52. In this embodiment, second optical components 12 comprise one or more reflective materials on the surface of steering device 10 that faces illuminating source 20. Light 22 originates at illuminating source 20 and second optical component 12 reflects light 22 back toward light sensor 21.

Although the reflective material of second optical component 12 may be any number of suitable materials, it is preferably a retroreflector 50. Retroreflectors are optical devices that return any incident light back in exactly the direction from which it came, and comprise examples of reflective materials that may be employed in the practice of the invention. Several retroreflectors are commercially available, for example one type of retroreflector is made from a trio of mutually perpendicular surfaces such as is found at the corner of a cube, which when all three surfaces are reflective, will reflect a light ray at exactly a 180 degree turn. Another type comprises small beads of a high index material embedded in a transparent matrix, and is particularly useful where large surface areas need to be covered, for example in road signs, or where design flexibility is required. Referring to FIG. 5, in this embodiment, retroreflector 50 comprises a filter 53 that blocks higher wavelength light 51. Thus, of the two light wavelengths emitted by illuminating source 20, retroreflector 50 reflects only lower wavelength light 52.

The operation of the reflective method is based on the principle of optics where light sensor 21 comprises a two dimensional array of photosensors as are known in the art that sense the absence and presence of light to create an image. In this case, the rotary motion of steering device 20 is converted into a light pattern via reflected light 22 on the checkerboard-patterned filter of light sensor 21. In some embodiments, light sensor 21 is very small, and each checkerboard square may be on the order of microns. The light sensors are sensitive to light having at least two different wavelengths, corresponding to higher wavelength light 51 and lower wavelength light 52 emitted from illuminating source 20.

In one embodiment, a checkerboard-patterned filter filters reflected light 22 before light 22 hits light sensor 21. By way of a non-limiting example, and referring to FIGS. 2 and 5, lighter checkerboard squares 23 are filters that allow both higher wavelength light 51 and lower wavelength light 52 to pass on to light sensor 21. Similarly, darker checkerboard squares 24 are filters that block lower wavelength light 52 from passing on to light sensor 21. Thus, as between higher wavelength light 51 and lower wavelength light 52, retroreflector 50 reflects only lower wavelength light 52 (because of the presence of filter 53) and darker checkerboard squares 24 block lower wavelength light 52 from passing on to light sensor 21. As a result, if light 22 from illuminating source 20 is filtered and reflected by retroreflector 50 and then hits darker checkerboard squares 24, light sensor 21 sense neither higher wavelength light 51 nor lower wavelength light 52. That is, the darker squares of sensor 21 sense relative darkness. At the same time, light 22 from illuminating source 20, which is filtered and reflected by retroreflector 50 and then hits lighter checkerboard squares 23, cause the light sensor 21 to sense lower wavelength light 52. That is, the lighter squares of sensor 21 sense relative brightness. Thus, in the case of light reflected from retroreflector 50, light sensor 21 captures an image of the retroreflector 50 in a high contrast checkerboard pattern.

While other reflected or ambient light may reach light sensor 21, light sensor 21 can distinguish between the images captured based on the other reflected or ambient light as compared to light reflected from retroreflector 50 because light originating or reflected from any other object will contain at least both lower wavelength light 52 and higher wavelength light 51, as shown in FIG. 5. In some embodiments, the retroreflector 50 reflects light so much more efficiently compared to other objects in the environment, that when image capture parameters such as exposure time are set to avoid image saturation, the retroreflector image is the only image captured by light sensor 21. The images captured by light sensor 21 will be analyzed and converted into information representing the position of retroreflector 50. The changes in the position of the retroreflector 50 (and thus steering device 10) are measured by the movement of the image captured by light sensor 21 as is known in the art. Thus, the image formed on light sensor 21 is exploited by the light sensor circuitry as is known in the art to produce digital outputs representing the rotation, rotation speed, and/or direction of steering device 10. Internal circuitry (not shown) converts direction and speed information from the first optical component 11 to the electronic application. Although any known method may be used, in this embodiment it is not necessary to compare successive images to determine movement of steering device 10, because light sensor 21 can be configured to provide absolute positioning of steering device 10 as is known in the art.

While some embodiments employ one second optical component 12, other embodiments have at least two. Additional second optical components represent redundancy in case one component is inadvertently covered, such as by a hand, or damaged. Moreover, multiple second optical components allow for a "check" in the calculations of each component position. That is, the calculations determining the rotation and speed of each second optical component 12 can be compared, giving confidence in the validity of the result.

First optical component 11 and second optical component 12 may also measure movement of steering device 10 toward and away from light sensor 21, or the rotational position of the wheel about either of two perpendicular axes in the plane of the wheel, as well as the more usual rotational axis normal to the plane of the wheel. This may be accomplished by any known manner, such as by measuring the change in the imaged size of one retroreflecting component, the change in the separation between the two imaged components, or the travel time of light 22 between the illuminating source 20 and second optical components. The measurement of forward and backward steering device movement allows for an additional manipulation function to electronic device 14. By way of a non-limiting example, the manipulation function could relate to the movement of an airplane steering device forward and backward in a computer game or simulation.

In the reflective method embodiment, steering device 10 requires no power source to power retroreflectors 50. In embodiments where no other features of steering device 10 require power, the steering device 10 requires no power and thus can be very lightweight. A lightweight steering device 10 is advantageous to limit fatigue of user 13. In addition, because retroreflectors 50 have no moving parts and are durable, there is less chance for damage due to normal wear and tear. Steering device 10 is very inexpensive because retroreflectors require no power or internal circuitry.

Figure 4:
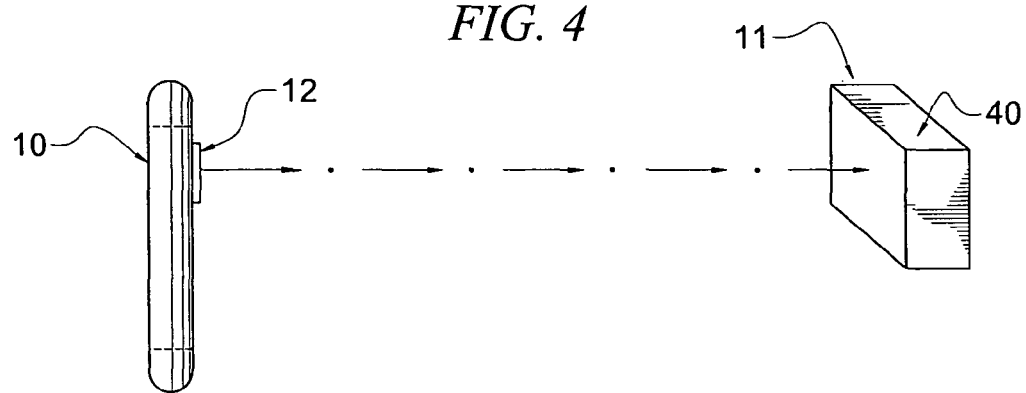
FIG. 4 is a side view of a portion of an embodiment of the present invention.

In another embodiment, represented in FIG. 4, steering device 10, first optical component 11, and second optical component 12 use known optical imaging technology to measure the rotation, the rotational direction and/or speed of steering device 10. In the optical imaging method, second optical components 12 comprise at least one imaging mechanism that is in communication with first optical component 11. The imaging mechanism comprises a two-dimensional array of photosensors. In this embodiment, any suitable light source may be used, including, but not limited to, ambient light or infrared light.

The imaging mechanism of second optical components 12 takes numerous successive images of the surrounding environment and compares the relative change in each successive image to detect direction and amount of movement. Images are correlated to detect features that are common to a succession of images. One of the captured images serves as a reference frame, which is stored, and a second, successive image is captured. The two successive images should have largely overlapping fields of view, so that the reference frame and the sample frame include a number of common features. Preferably, the imaging mechanism contains optics that provide a focus nominally at infinity, intentionally presenting an off-sharp image to the array of photosensors. The images will typically include windows, lamps, furniture, and first optical component 11. No special environment is needed for the images as long as fixed objects in the area of steering device 10 allow for comparison of successive images. Optionally, one or more stationary sources of light may be added within the environment to be imaged so that successive images of fixed light are used for correlation. For example, first optical component 11 may comprise a source of light, such as, but not limited to, infrared light or laser light.

Comparison of successive images is performed by holding one frame in a fixed position and repeatedly shifting the successive frame to determine which shifted position best approximates an alignment of the imaged features that are common to the two images, thereby determining the horizontal and vertical movement of the imaging array during the interval between acquiring the two frames. The shifts are performed computationally and are shifts of pixel values in the photosensors. Interpolations are performed to determine angular displacement of less than a full pixel, and this the system detects changes in horizontal, vertical, and combinations of horizontal and vertical movement.

Optionally, movement in a third direction, such as movement of steering device 10 forward and backward in relation to user 13, may be detected by computing the change in distance between imaged objects, using additional known imaging mechanisms dedicated to measuring movement forward or backward, or other known methods. The measurement of forward and backward steering device movement allows for an additional manipulation function to electronic device 14. By way of a non-limiting example, the manipulation function could relate to the movement of an airplane steering device forward and backward in a computer game or simulation.

In some embodiments, second optical components 12 preferably include a transmitter for wireless transmitting the data representing the movement of steering device 10. By way of non-limiting example, the signal may be an infrared beam. In lieu of a wireless transmitter, a chord may be used. First optical component 11 comprises a data receptor 40. In some embodiments, data receptor 40 is configured to receive at least optical data relating to steering device 10. As used herein, optical data relating to steering device 10 means data that can be used to provide a manipulation function in the electronic application relating to the relative movement of steering device 10. In some embodiments, the optical data comprise optical images. In other embodiments, second optical components 12 process the optical images before reaching data receptor 40, and the optical data sent to data receptor 40 represent the directional and speed information that has been calculated from the optical images. Optical data from second optical components 12 are sent to data receptor 40 for transfer to electronic device 14. In some embodiments, data receptor 40 is part of electronic device 14. Changes in direction and location of steering device 10 are translated into the proper manipulation function for the object in the electronic application.

In one embodiment, steering device 10 houses internal circuitry as is known in the art to compute the relative movement based on data from second optical components 12. The resulting computation data are sent to data receptor 40 and electronic device 14 translates the data into the proper manipulation function as known in the art. In another embodiment, second optical components 12 send the images directly to data receptor 40 and data receptor 40 houses internal circuitry as is known in the art to compute the relative movement of second optical components 12 (and thus steering device 10).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller system for manipulating objects associated with an application executed on an electronic device, the system comprising:
    a handheld controller operable to manipulate at least one of a position and an orientation of an object of the application;
    a first optical component communicatively coupled to the electronic device, the first optical component comprising an illuminating device configured to emit light having at least two different wavelengths and, further comprising an imaging sensor that incorporates a checkerboard patterned filter having a first portion configured to block a lower wavelength of the at least two different wavelengths, and a second portion configured to propagate the lower wavelength and an additional wavelength that is a higher wavelength of the at least two different wavelengths; and
    a second optical component comprising:
        a first reflector attached to the handheld controller; and
        a blocking filter configured to block the higher wavelength of the at least two wavelengths from impacting upon the first reflector, whereby the first reflector redirects towards the imaging sensor, the lower wavelength of the at least two different wavelengths while eliminating redirection of the higher wavelength from the first reflector towards the imaging sensor.

2. A controller system for controlling an electronic device containing a computer that is operable to execute an application, the controller system comprising:
    a display unit configured to display an image of an object generated by the application;
    a light emitting unit communicatively coupled to the electronic device, the light emitting unit configured to emit a first beam of light at a first wavelength and a second beam of light at a second wavelength, wherein the first wavelength is lower than the second wavelength;
    a handheld steering device operable by a user to control at least one of a position and an orientation of the object displayed on the display unit, the steering device comprising a) a first retroreflector attached to a surface of the steering device, and b) a blocking filter configured to block the second wavelength from impacting upon the reflector, whereby the reflector is configured to reflect the first wavelength while eliminating reflection of the second wavelength; and
    a light sensor unit configured to generate a light pattern that provides positional information of the first retroreflector, the light sensor unit comprising a checkerboard filter and a light sensor, the checkerboard filter having a first portion configured to block the second wavelength and to propagate into a first part of the light sensor, the first wavelength reflected by the first retroreflector, and a second portion configured to propagate into a second part of the light sensor, the first and the second wavelengths.

3. The controller system of claim 2, wherein the first part of the light sensor provides darkness information and the second part of the light sensor provides brightness information.

4. The controller system of claim 2, wherein the light sensor incorporates an image capture parameter that is selected based upon a reflectivity factor of the first retroreflector, whereby the light sensor is operative to generating a unique image of the first retroreflector by excluding other objects during image capture.

5. The controller system of claim 2, wherein the steering device is an unpowered steering device.

6. The controller system of claim 2, wherein the steering device is an unpowered steering wheel comprising a second retroreflector that is configured to operate as a redundant retroreflector when the first retroreflector is inoperable, the first and second retroreflectors attached to the surface of a circumferential portion of the steering wheel and separated from each other by a distance.

7. The controller system of claim 1, wherein the size of the first retroreflector is selected to provide distance information of the handheld controller from the first optical component, based on detecting a change in size of the first retroreflector between at least two images captured by the imaging sensor.

8. The controller system of claim 1, wherein the handheld controller further comprises a second retroreflector, and wherein the first optical component is configured to capture an image of the first and the second retroreflectors located on the handheld controller and derive therefrom, rotational position information of the handheld controller.

9. The controller system of claim 1, wherein the handheld controller further comprises a second retroreflector, and wherein the first optical component is configured to capture an image of the first and the second retroreflectors located on the handheld controller and detect a separation distance between the first and second retroreflectors for deriving distance information of the handheld controller from the first optical component.

10. The controller system of claim 1, wherein the handheld controller further comprises a second retroreflector, and the first optical component is configured to capture a second image of the second retroreflector for verifying validity of positional information derived from a first image of the first retroreflector.

11. The controller system of claim 10, wherein the first image is the same as the second image.

* * * * *